J. Thomas, Jr.
Oil Pump.
Nº 44,264.   Patented Sept. 13, 1864.
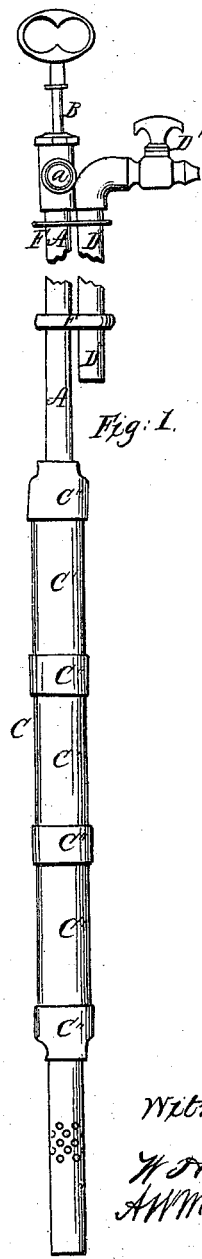
Fig. 1.
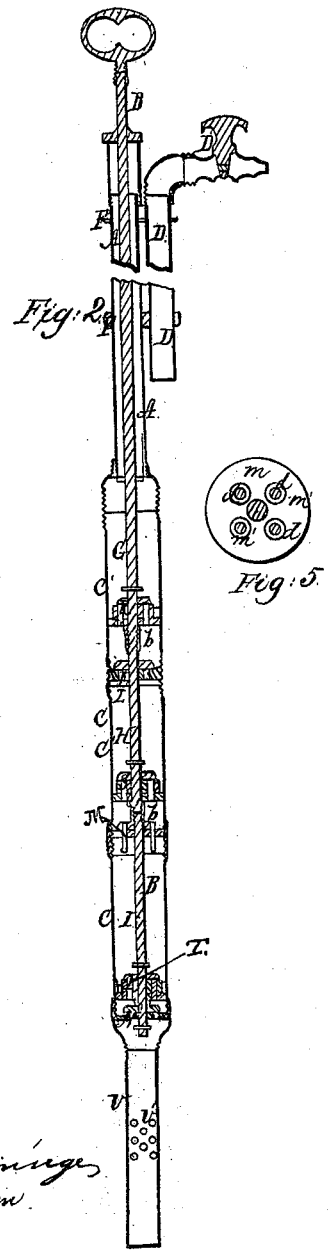
Fig. 2.
Fig. 5.
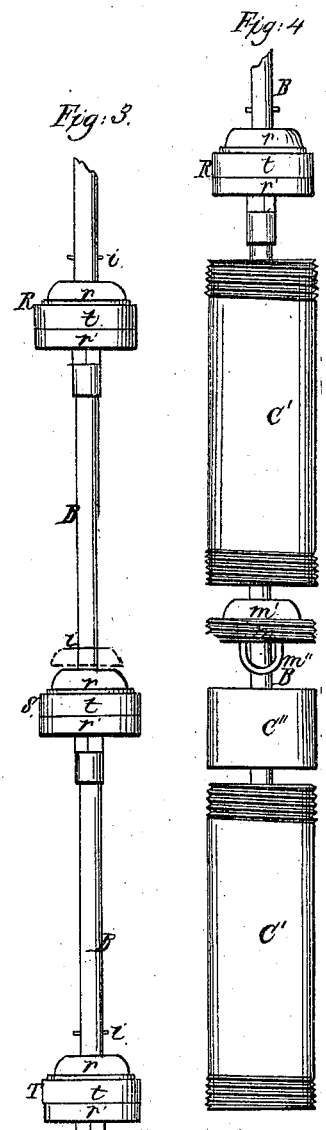
Fig. 3.
Fig. 4.
Witnesses:
Inventor:
Joshua Thomas Jr.

UNITED STATES PATENT OFFICE.

JOSHUA THOMAS, JR., OF CLEVELAND, OHIO, ASSIGNOR TO HIMSELF AND B. BARKER, OF SAME PLACE.

IMPROVEMENT IN OIL-WELL PUMPS.

Specification forming part of Letters Patent No. 44,264, dated September 13, 1864.

*To all whom it may concern:*

Be it known that I, J. THOMAS, Jr., of Cleveland, in the county of Cuyahoga and State of Ohio, have invented certain new and useful Improvements in Oil-Well Pumps; and I do hereby declare that the following is a full and complete description of the construction and operation of the same, reference being had to the accompanying drawings, making a part of this specification, in which—

Figure 1 represents the pump, of which Fig. 2 is a vertical section and Figs. 3, 4, and 5 are enlarged detached sections.

Like letters of reference denote like parts in the several views.

My improvement relates to a pump for oil-wells, made up of sections, in which are two or more valves and chambers operated by two or more valve-plungers on the pump-rod, that, in case one of the valves should be obstructed in any way, the pump will still operate; and my invention relates also to an auxiliary side pipe, whereby the pump is relieved from the pressure of gas, which is so great in some wells that it would otherwise prevent the valves from working, and where there is not pressure enough either from gas or air air can be conveyed into the well through this pipe.

In Figs. 1 and 2, A represents a pipe or tube, which may be of any desired length, according to the depth of the well, through which extends the pump-rod B. The lower end of this pipe is screwed into the top of the cylinder or barrel C of the pump, and to the upper end is connected the spout a, for the egress of the oil and water. Alongside and parallel with this pipe is arranged an auxiliary pipe, D, curved outward at the top, in which there is a faucet, D'. These two pipes are secured in their relative position by passing through the plates F and F'; or they can be secured in any other suitable manner. The barrel C is made up of sections C', screwed into couplings C'', forming three chambers, G H I, inside, separated by valves L M N.

The valve M is represented enlarged in Fig. 4, and consists of the valve-seat m, designed to be screwed into the center of one of the couplings C'', the face of which is shown in Fig. 5.

m' is the valve, connected to the valve-seat by loops m'', secured to the valve, and passing through holes d in the seat to control the ascent of the valve.

The valves can all be made alike, or they can vary in their construction. In place of the loop there may be a stem, as in the lower valve, N, or the valve may simply move on the rod B, as at L, there being a pin or projection on the rod to guide the ascent of the valve. The pump-rod B extends down into the barrel C, through the center of the valves and valve-seats, the lower part of which is formed of sections connected by screw joints or couplings, as at b b, so as to adjust the valves in the pump-barrel alternate with the plungers on the rod.

R S T are the plungers on the pump-rod that operate in connection with the valves L M N in the chambers. An enlarged view of the rod and plungers is seen in Fig. 3. These valve-plungers are formed of valves r and plungers r', secured to the rod B, which form seats for the valves, and are similar to the valve-seats in the barrel of the pump. The valves move up and down on the rod B, being guided in their ascent by the pins i, as indicated by the dotted lines r'' in Fig. 3. There is packing around the plungers, as represented at t.

To the lower end of the barrel or cylinder C is connected, by a screw joint or coupling, the pipe U, closed at the bottom and perforated at U'. This pump is operated by the vertical motion of the pump-rod, the operation of which produces a vacuum in the chambers, and by means of the valves the oil is carried up through the chambers into the pipe A and runs out at the spout a of the pump. But the advantages of the peculiar construction of this pump must be described in reference to its practical operation in connection with oil-wells.

Hitherto in many productive wells from the flow of water and gas, it has been found impracticable to use pumps, for the gas in place of oil would rise in the pump and the pressure of the gas would keep the valves continually open, rendering the pump inoperative. It often occurs, too, that from the manner in which pumps have to be placed in wells, with a seed-bag around them below the entrance of the lowest water-vein, to separate the oil and water, so as not to pump up the water with the oil, that the atmosphere is almost entirely excluded from the oil, and there is not pressure enough to cause the oil to rise in the pump, thereby preventing its operation. With my pump these difficulties are entirely removed. When it is put in the well, the seed-bag being around the two pipes A and D, below the lowest water-vein, as described, if there is too great a flow of gas it finds vent through the side pipe, D, being let off at the top by suitably adjusting the faucet D', and the valves in the pump are relieved from the pressure of the gas, which would otherwise prevent their operation, and the pressure of the atmosphere will always be sufficient on the oil in the well, for it will be conveyed in constantly through the pipe D. Thus, this auxiliary pipe answers the purpose of removing gas from a well where it is too abundant, and of conveying air into a well where it is deficient, or where it is necessary to produce the required pressure on the oil, and also for the discharge of the oil in a natural flowing well. When a well begins to flow in this way the pumps now in use have to be removed and a pipe inserted. But with this pump, the oil will flow out through the side pipe, avoiding the necessity of removing the pump, which will be all ready in place for pumping out the oil when it ceases to flow.

In operating this pump, the oil coming in through the perforations in the pipe U raises the valve N, filling the chamber I, passing through the valve in the plunger as it ascends up through the valve M into the chamber above, and so on. Every time the pump-rod descends the valves in the plungers open and the pump-valves close, and as the rod with the plungers ascend the pump-valves open and the valves in the plungers are closed, thus carrying up the oil from one chamber to another, filling up the pipe A, and flowing out at the top.

One object of having two or more valves in the pump and plungers in place of one is, that should a stone or any obstacle get in under the lower valve, N, raising it and rendering it inoperative, the oil would still rise through the next valve, M, from which it could be pumped out, or, if this valve should be obstructed in any way, the pump could still be operated from the valve L above. The same also is true of the valves in the plungers. Should any one or two of them be obstructed or get out of repair in any way the remaining one will still keep the pump in successful operation. There is great liability of such obstructions getting into the valves, and where there is but one set of valves in the pump the pump will very often in this way be rendered inoperative.

What I claim as my improvement, and desire to secure by Letters Patent, is—

1. The valve-plungers R S T, valves L M N, and sectional jointed pump-rod B, when arranged so as to operate in combination with two or more coupled chambers, G H I, conjointly, as and for the purpose described.

2. In combination therewith, the auxiliary side pipe, D, substantially as and for the purpose set forth.

JOSHUA THOMAS, Jr.

Witnesses:
W. H. BURRIDGE,
A. W. McCLELLAND.